(12) United States Patent
Yang et al.

(10) Patent No.: US 8,351,119 B2
(45) Date of Patent: Jan. 8, 2013

(54) MULTI-COATED HYBRID OPTICAL FILM STRUCTURE

(75) Inventors: Seng-Lu Yang, Hsinchu (TW);
Hua-Chieh Chen, Hsinchu (TW);
Po-Chao Huang, Hsinchu (TW);
Chao-Li Su, Hsinchu (TW)

(73) Assignee: Gigastorage Corporation, Hsinchu (TW)

( * ) Notice: Subject to any disclaimer, the term of this patent is extended or adjusted under 35 U.S.C. 154(b) by 494 days.

(21) Appl. No.: 12/690,760

(22) Filed: Jan. 20, 2010

(65) Prior Publication Data

US 2011/0176213 A1    Jul. 21, 2011

(51) Int. Cl.
*G02B 13/20*    (2006.01)

(52) U.S. Cl. .......................................... 359/599; 359/707
(58) Field of Classification Search ........................ None
See application file for complete search history.

*Primary Examiner* — Derek S Chapel
(74) *Attorney, Agent, or Firm* — Jackson IPG PLLC (57) ABSTRACT

An optical film has multi-coated layers. Diffusion layers are used to scatter light. Each diffusion layer has an interface microstructure. A condensing optical layer is used to concentrating light. A design of a multi-coating technology is thus used for scattering and concentrating light. By integrating scattering and concentrating materials in a single optical film, cost is effectively reduced. By using diffusion layers having interface microstructures, interface-dominating mechanism, not only hybrid optical performance with luminance and haze is effectively enhanced; but also quality variations owing to particles added or film warp and scoring on the beneath optical film owing to particles coated are reduced.

12 Claims, 10 Drawing Sheets

MULTI-COATED HYBRID OPTICAL FILM STRUCTURE

FIELD OF THE INVENTION

The present invention relates to an optical film; more particularly, relates to using diffusion layers having interface microstructures, interface-dominating mechanism, to scatter light for providing an hybrid optical film used in a back-light module having a high luminance and a high quality.

DESCRIPTION OF THE RELATED ARTS

Widely used liquid crystal display (LCD) comprises front plate and back light. The front plate comprises a liquid crystal, an alignment film, an ITO conductive glass, a colored light filter, a polarizer and a drive IC module. The back light comprises a light source of cold cathode fluorescent lamp (CCFL) or light-emitting diode (LED); a reflector; a light guide plate; a diffuser; a diffusing film; and a condensing film. Technologies for back light are focused on how to effectively transform a linear light source (CCFL) or a point light source (LED) into a surface light source having a high uniformity; and on how to obtain an on-axis luminance having a high gain with the least light source used. The reflector is used to recycle reflected or scattered light for improving light usage; the light guide plate and the diffuser are used to direct light for obtaining a high directive light and to eliminate lamp mura; the diffusing film is used to increase uniformity of the light source on surface and to eliminate or reduce optically visible defects owing to materials or assembling process; and, the condensing film is used to enhance an on-axis luminance gain. Yet, too many light sources not only increase cost but also generate heat with life time and related material quality reduced and energy waste increased for mobile device.

Concerning the diffusing film, a layer with diffusing particles are usually coated on a transparent substrate to scatter light for obtaining a light uniformity through nebulization. Concerning the condensing film, a microstructure layer capable of light concentration is usually coated on a transparent substrate, which is usually a prism microstructure to fully use luminous flux for enhancing on-axis luminance of LCD.

Figure 10:
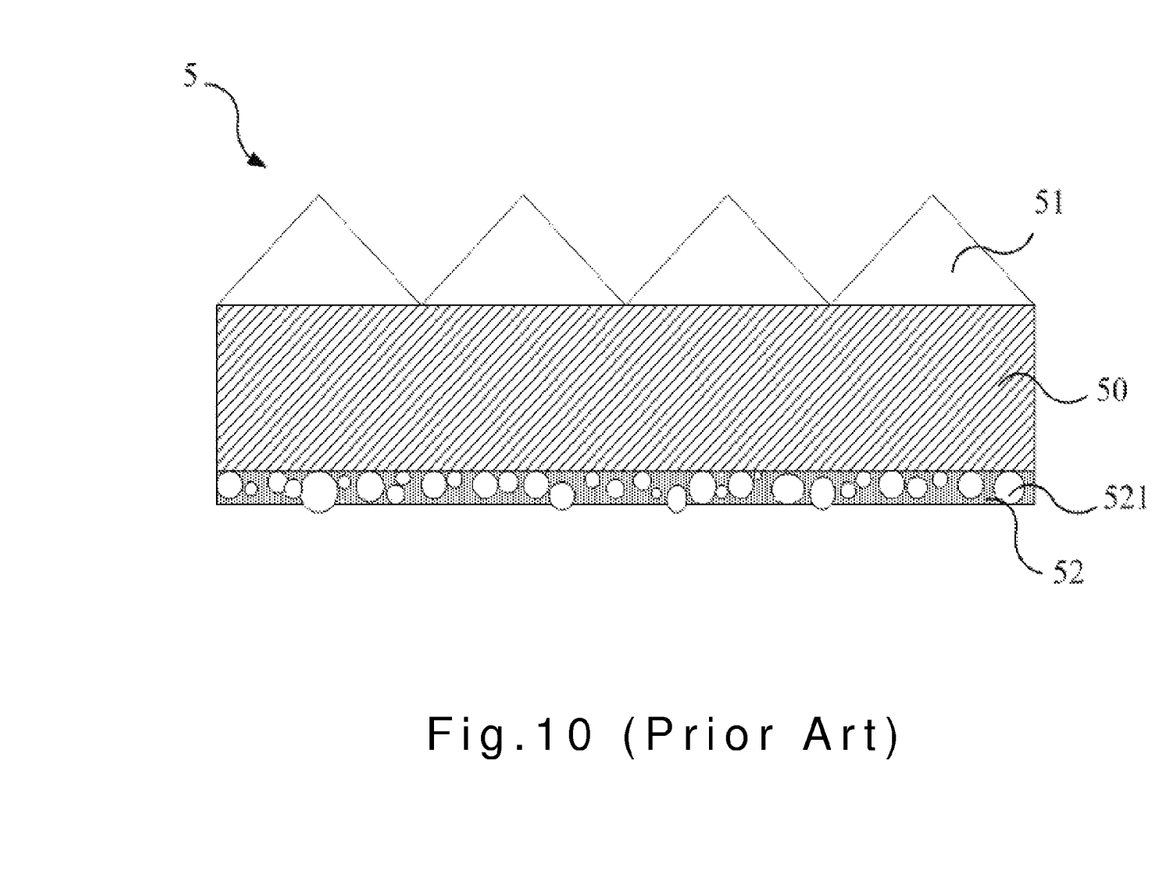
FIG. 10 is the sectional view of the prior art.

A hybrid optical film 5 claimed in U.S. Pat. No. 6,280,063, as shown in FIG. 10, has a prism structure 51 above a transparent substrate 50 for concentrating light; and a diffusion layer 52 having uniformly-distributed diffusing particles 521 below the transparent substrate 50 for diffusing light. Yet, the hybrid optical film 5 has trouble in controlling its warp. The diffusing particles are not easily uniformly distributed; and scoring on beneath the film may easily happen owing to the protruded diffusing particles. Moreover, the diffusing particles may easily reduce a rate of light penetration and further impair optical characteristics of the hybrid optical film 5. Hence, the prior arts do not fulfill all users' requests on actual use.

SUMMARY OF THE INVENTION

The main purpose of the present invention is to use diffusion layers having interface microstructures, interface-dominating mechanism, to scatter light for providing an hybrid optical film used in a back-light module having a high luminance and a high quality.

The second purpose of the present invention is to use a design of a multi-coating technology for scattering and concentrating light by integrating scattering and concentrating materials in a single optical film to effectively reduce cost and by using diffusion layers having interface microstructures for scattering incident light not only to effectively enhance a luminance but also to reduce quality variations owing to particles added or film warp and scoring on the beneath optical film owing to particles coated.

The third purpose of the present invention is to enhance a quality and characteristics of a hybrid optical film with a simplified assembly of a back-light module and an improved assembling efficiency.

To achieve the above purposes, the present invention is a multi-coated hybrid optical film structure, comprising a transparent substrate, a multi-coated layer and a protective coated layer, where the transparent substrate has two opposite surfaces; the multi-coated layer is located on one of the two opposite surfaces of the transparent substrate; the multi-coated layer comprises an inner layer of a diffusion layer combination and an outer layer of a condensing optical layer; the diffusion layer combination scatters incident light; the diffusion layer combination comprises at least one diffusion layer; the diffusion layer has an interface microstructure; the interface microstructure has a roughness greater than 0.5 μm; the condensing optical layer is located on the diffusion layer combination; the diffusion layer combination is located between the condensing optical layer and the transparent substrate; the condensing optical layer has a condensing microstructure to concentrate light; the protective coated layer is located on the other one of the two opposite surfaces of the transparent substrate; the protective coated layer is anti-static and wear-resistant; and the condensing optical layer has the greatest refractive index and the lowest diffusion layer has the smallest refractive index while the other diffusion layers have refractive indexes in between. In certain design, the refractive indexes for the diffusion layer may be arranged in a quite different way to achieve a sophisticated application.

Accordingly, a novel multi-coating hybrid optical film structure is obtained.

BRIEF DESCRIPTION OF THE DRAWINGS

The present invention will be better understood from the following detailed descriptions of the preferred embodiments according to the present invention, taken in conjunction with the accompanying drawings, in which.

DESCRIPTIONS OF THE PREFERRED EMBODIMENTS

The following descriptions of the preferred embodiments are provided to understand the features and the structures of the present invention.

Figure 1:
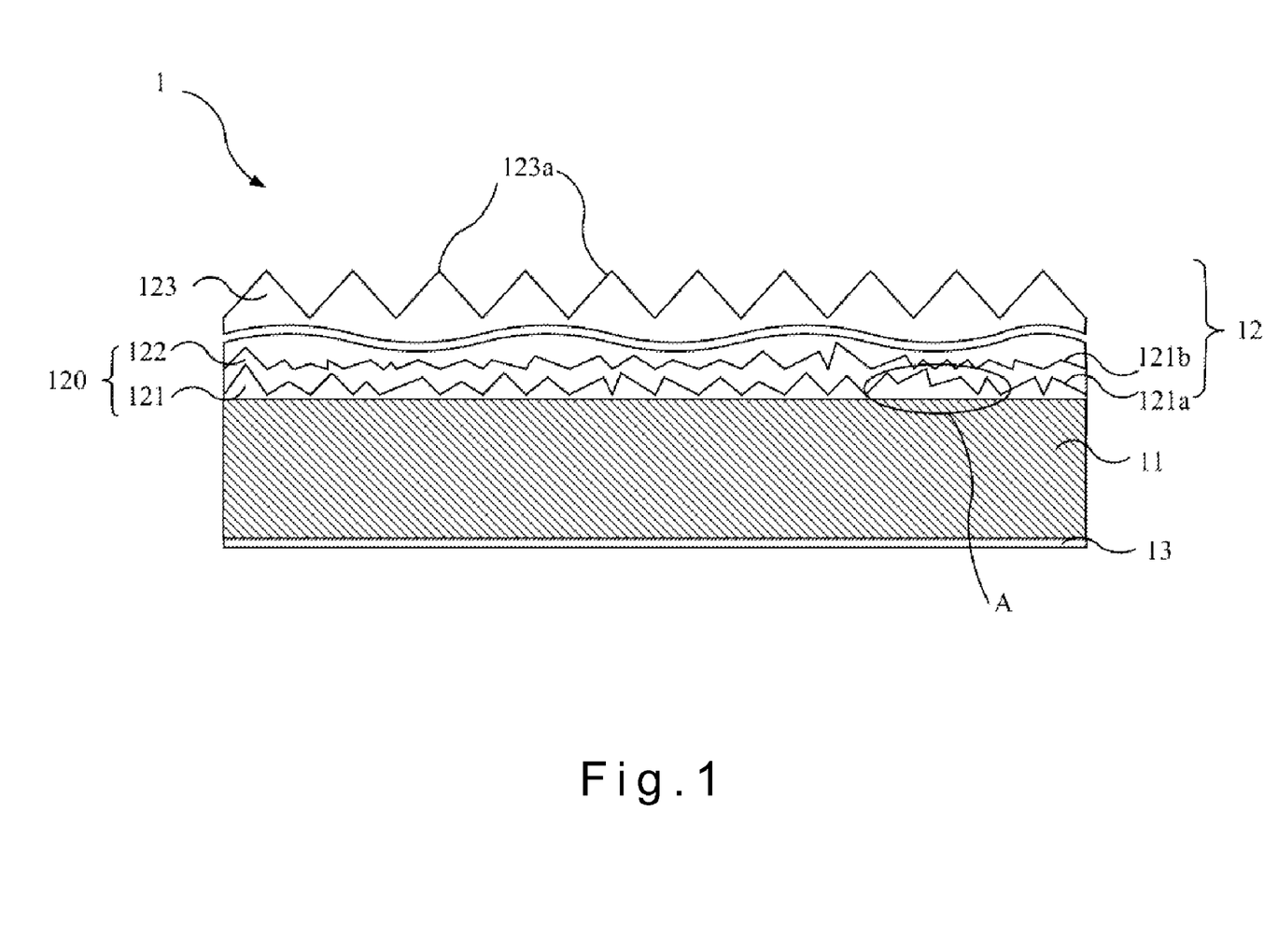
FIG. 1 is the sectional view showing the first preferred embodiment according to the present invention.

Please refer to FIG. 1, which is a sectional view showing a first preferred embodiment according to the present invention. As shown in the figure, the present invention is a multi-coated hybrid optical film structure 1, comprising a transparent substrate 11, a multi-coated layer 12 and a protective coated layer 13, where diffusion layers having random interface micro-structures are used for scattering incident light.

The transparent substrate 11 has two opposite surfaces.

The multi-coated layer 12 comprises an inner layer and an outer layer. The inner layer is a diffusion layer combination 120 on one of the two surfaces of the transparent substrate 11 for scattering incident light. Therein, the diffusion layer combination 120 comprises at least one diffusion layer (a first diffusion layer 121 and a second diffusion layer 122) each having an interface microstructure 121a,121b;

each diffusion layer has a thickness between 1 and 50 micrometers (μm); and, each diffusion layer is further added with an organic or non-organic particulate material.

The outer layer is a condensing optical layer 123 on the diffusion layer combination 120; and the diffusion layer combination 120 is located between the condensing optical layer 123 and the transparent substrate 11. Therein, the condensing optical layer 123 has a condensing microstructure 123a for concentrating light; and, the condensing microstructure is a prism condensing microstructure, a cone condensing microstructure, a lens condensing microstructure or a pyramid condensing microstructure.

The protective coated layer 13 is located on the other one of the two opposite surfaces of the transparent substrate 11; and is anti-static and wear-resistant. Thus, a novel multi-coating hybrid optical film structure 1 is obtained.

In the multi-coated layer 12, the condensing optical layer 123 has a greatest refractive index; the lowest diffusion layer 121 of the diffusion layer combination 120 has a smallest refractive index; and the other diffusion layers of the diffusion layer combination 120 has a refractive index between the greatest refractive index and the smallest refractive index. The first diffusion layer 121 and the condensing optical layer 123 are made of materials having great refractive indexes and the second diffusion layer 122 is made of a material having a small refractive index, where specific optical characteristics are thus provided.

Figure 2:
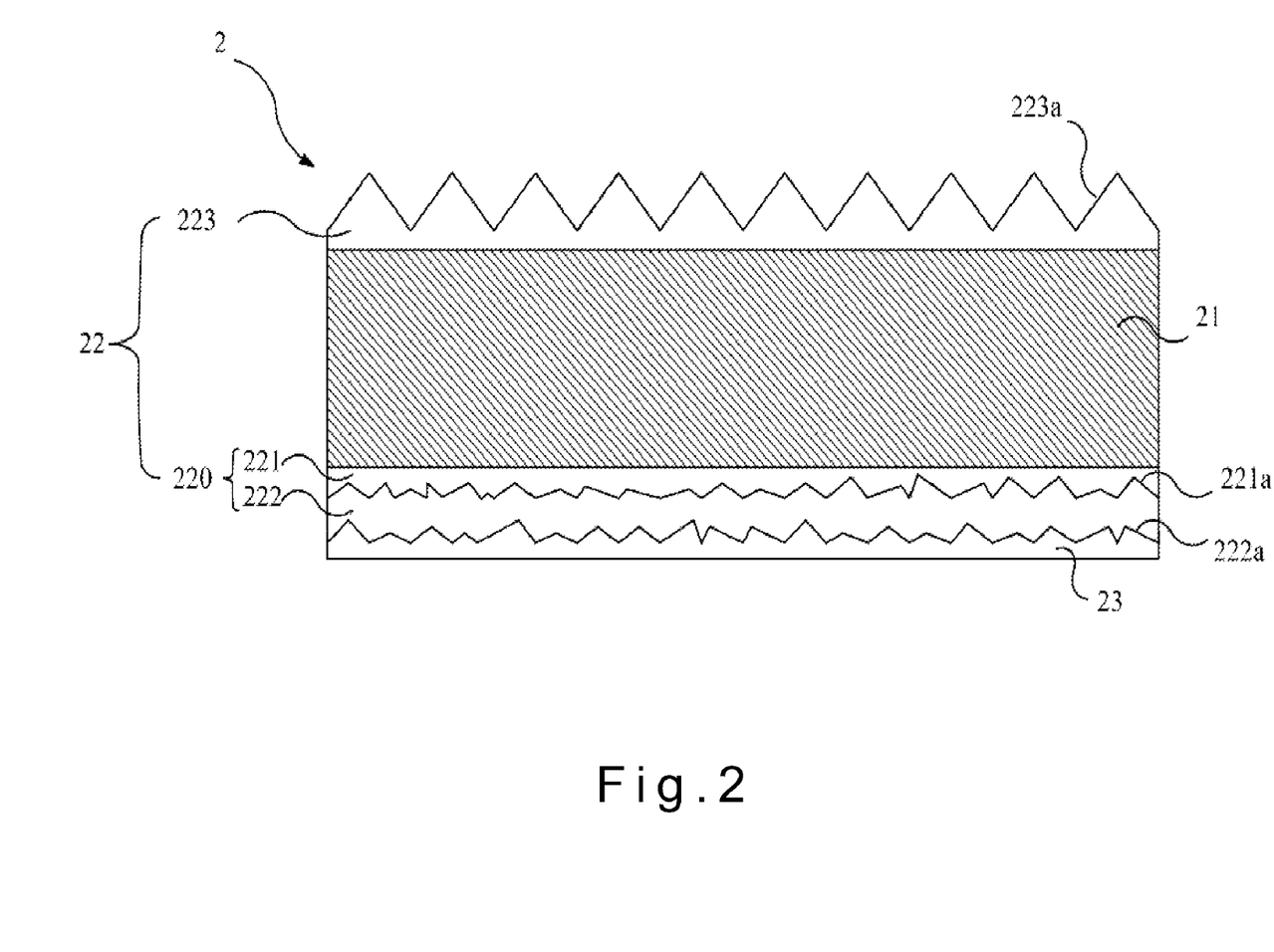
FIG. 2 is the sectional view showing the second preferred embodiment.

Please refer to FIG. 2, which is a sectional view showing a second preferred embodiment. As shown in the figure, the present invention is a multi-coated hybrid optical film structure 2, comprising a transparent substrate 21, a multi-coated layer 22 and a protective coated layer 23, where diffusion layers having random interface microstructures are used for scattering incident light.

The transparent substrate 21 has two opposite surfaces.

The multi-coated layer 22 comprises a diffusion layer combination 220 and a condensing optical layer 223. The diffusion layer combination 220 is located on one of the two opposite surfaces of the transparent substrate 21 for scattering incident light. Therein, the diffusion layer combination 220 comprises at least one diffusion layers (a third diffusion layer 221 and a fourth diffusion layer 222) each having an interface microstructure 221a,222a; each diffusion layer has a thickness between 1 and 50 μm; and, each diffusion layer is further added with an organic or non-organic particulate material.

The condensing optical layer 223 is located on the other one of the two opposite surfaces of the transparent substrate 21. Therein, the condensing optical layer 223 has a condensing microstructure 223a for concentrating light; and, the condensing microstructure is a prism condensing microstructure, a cone condensing microstructure, a lens condensing microstructure or a pyramid condensing microstructure.

The protective coated layer 23 is located on the diffusion layer combination 220; and is anti-static and wear-resistant. Thus, a novel multi-coating hybrid optical film structure 2 is obtained.

In the diffusion layers 221,222 of the diffusion layer combination 220, the diffusion layer closest to the transparent substrate 21 has a smallest refractive index; and the diffusion layer farthest to the transparent substrate 21 has a greatest refractive index. The third diffusion layer 221 and the protective coated layer 23 are made of materials having great refractive indexes and the fourth diffusion layer 222 is made of a material having a small refractive index, where specific optical characteristics thus provided.

Figure 3:
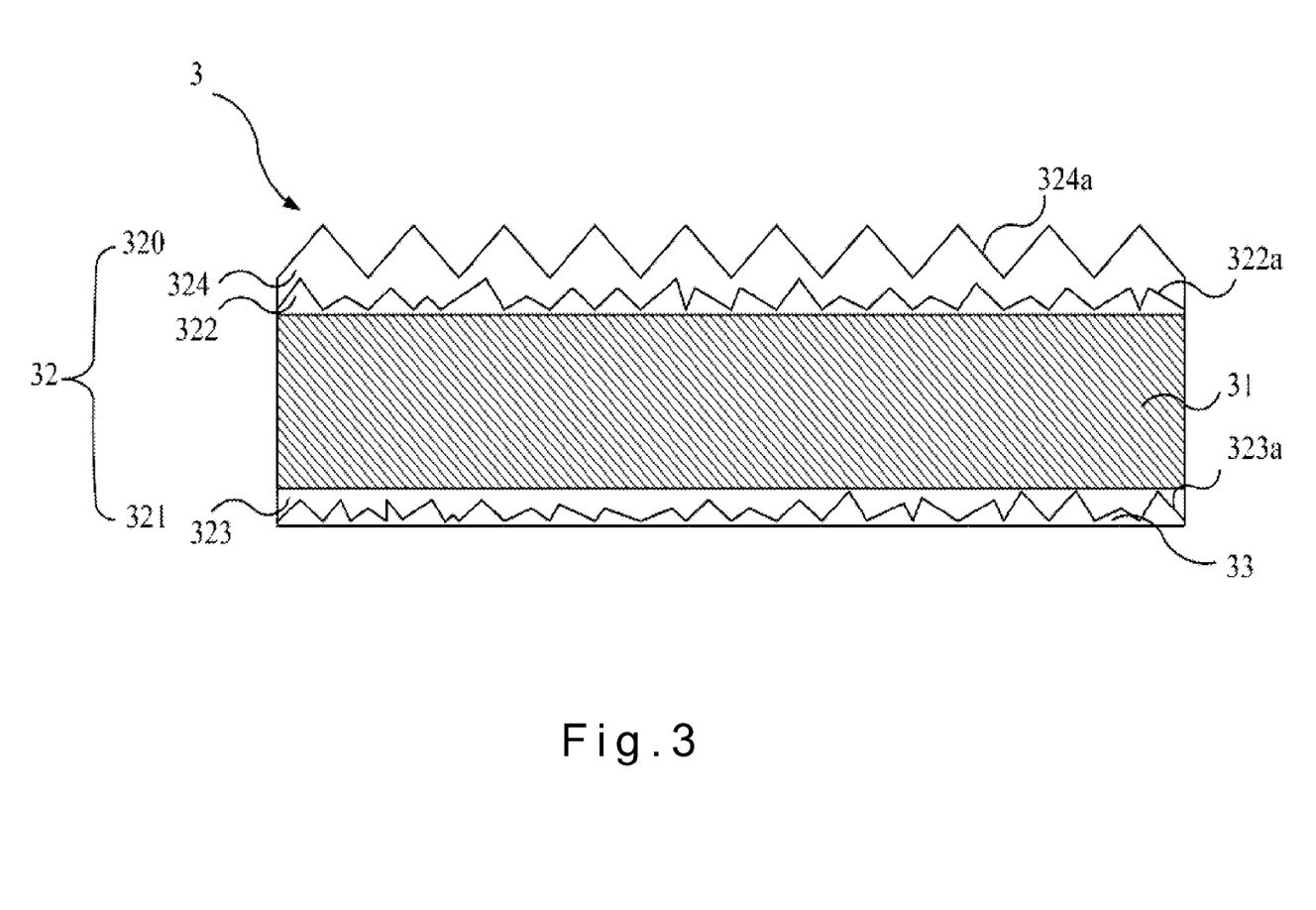
FIG. 3 is the sectional view showing the third preferred embodiment.

Please refer to FIG. 3, which is a sectional view showing a third preferred embodiment. As shown in the figure, the present invention is a multi-coated hybrid optical film structure 3, comprising a transparent substrate 31, a multi-coated layer 32 and a protective coated layer 33, where diffusion layers having random interface micro-structures are used for scattering incident light.

The transparent substrate 31 has two opposite surfaces.

The multi-coated layer 32 comprises two diffusion layer combinations 320,321 and a condensing optical layer 324. The two diffusion layer combinations 320,321 are separately located on two opposite surfaces of the transparent substrate 31 for scattering incident light. Therein, each of the diffusion layer combinations 320,321 comprises at least one diffusion layers 322,323 each having an interface microstructure 322a, 323a; each diffusion layer has a thickness between 1 and 50 μm; and, each diffusion layer is further added with an organic or non-organic particulate material.

The condensing optical layer 324 is located on one of the two diffusion layer combinations 320,321. Therein, the condensing optical layer 32 has a condensing microstructure 324a for concentrating light; and, the condensing microstructure is a prism condensing microstructure, a cone condensing microstructure, a lens condensing microstructure or a pyramid condensing microstructure.

The protective coated layer 33 is located on the other one of the two diffusion layer combinations 320,321; and is anti-static and wear-resistant. Thus, a novel multi-coating hybrid optical film structure 3 is obtained.

Each diffusion layer combination in FIG. 1, FIG. 2 and FIG. 3 obtains one, or more than one, diffusion layer through coating. Through two coatings (including a condensing optical layer), one diffusion layer is obtained; three coatings, two diffusion layers; and so forth.

Figure 4:
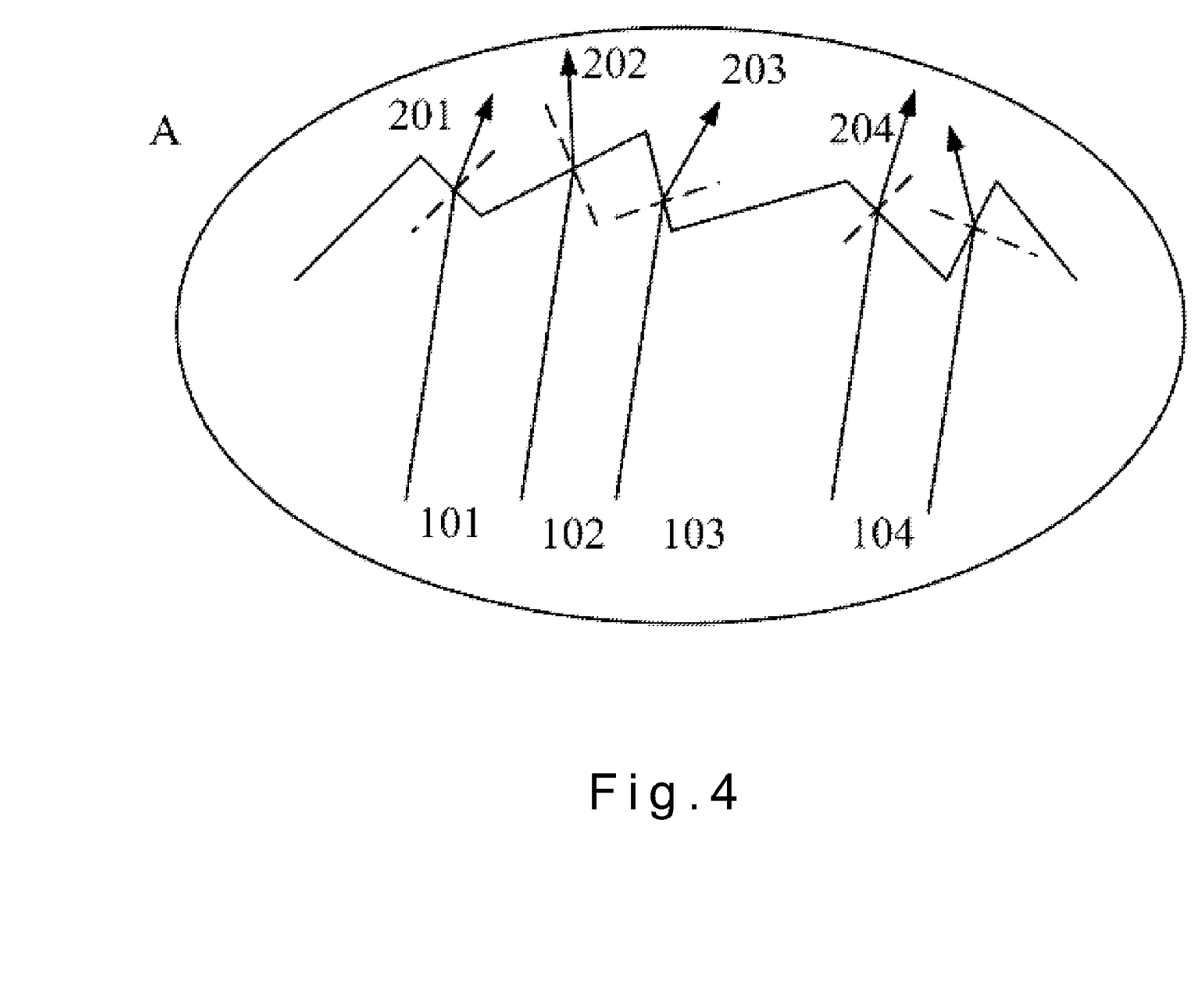
FIG. 4 is the enlarged view showing the area A in FIG. 1.
Figure 5:
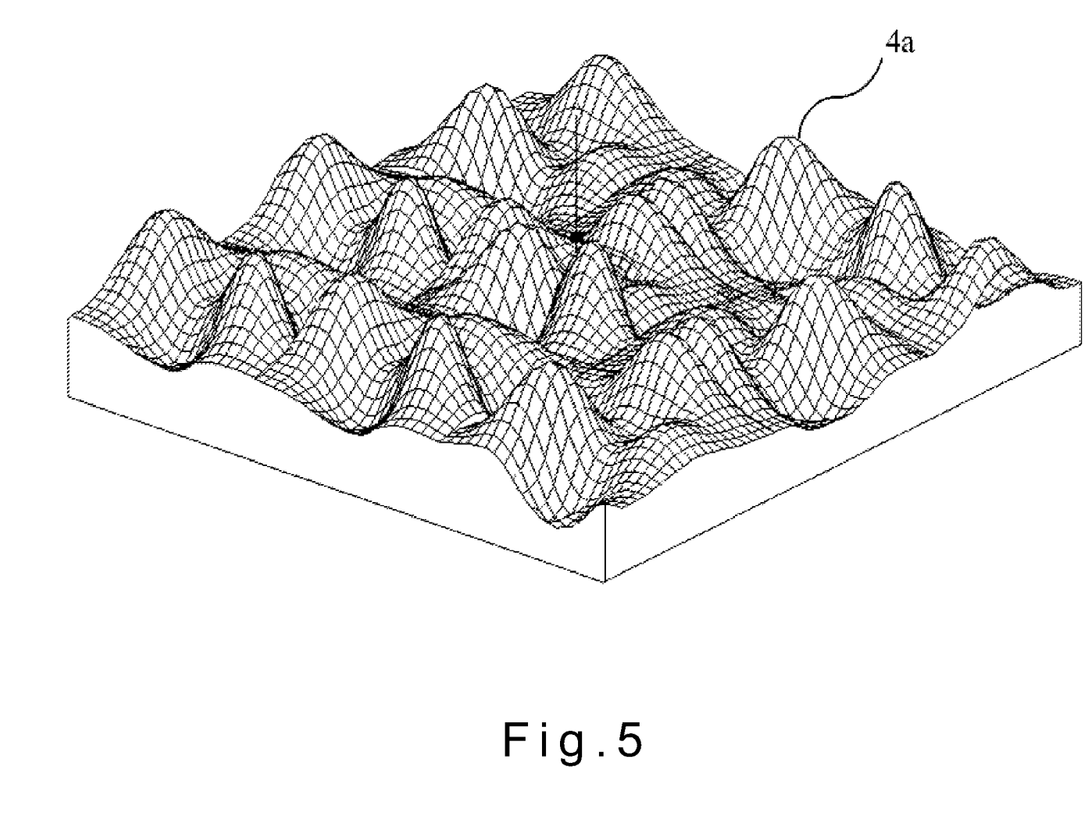
FIG. 5 is the perspective view showing the random interface microstructure.
Figure 6:
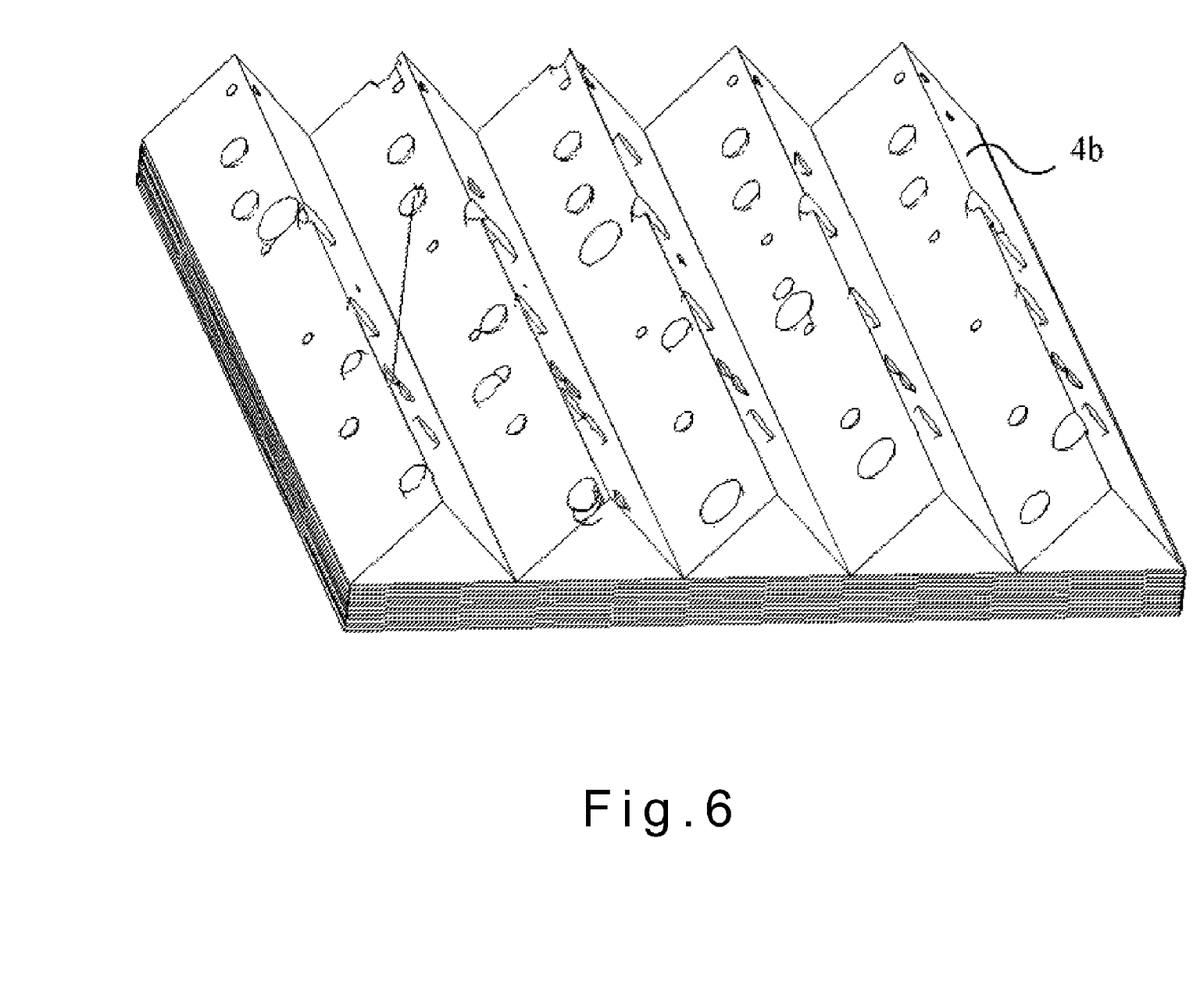
FIG. 6 is the perspective view showing the prism interface microstructure.
Figure 7:
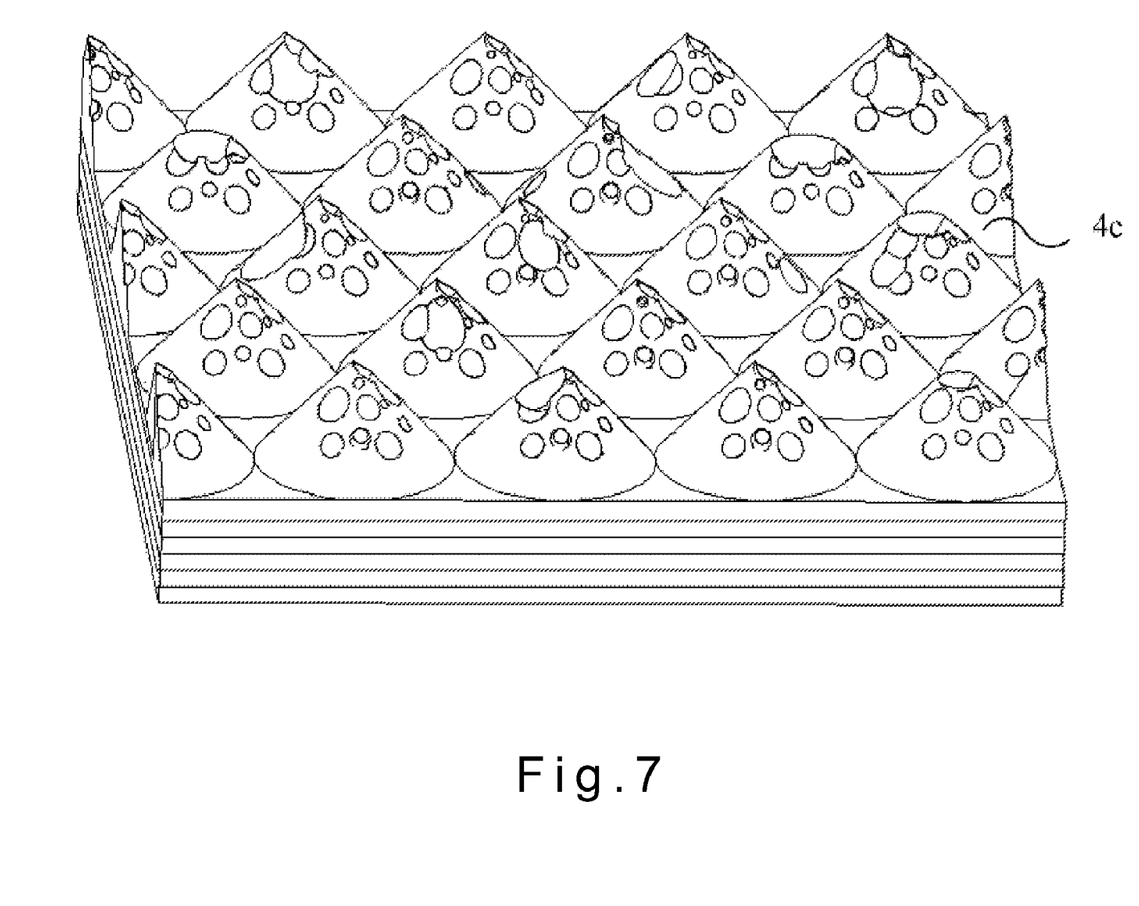
FIG. 7 is the perspective view showing the cone interface microstructure.
Figure 8:
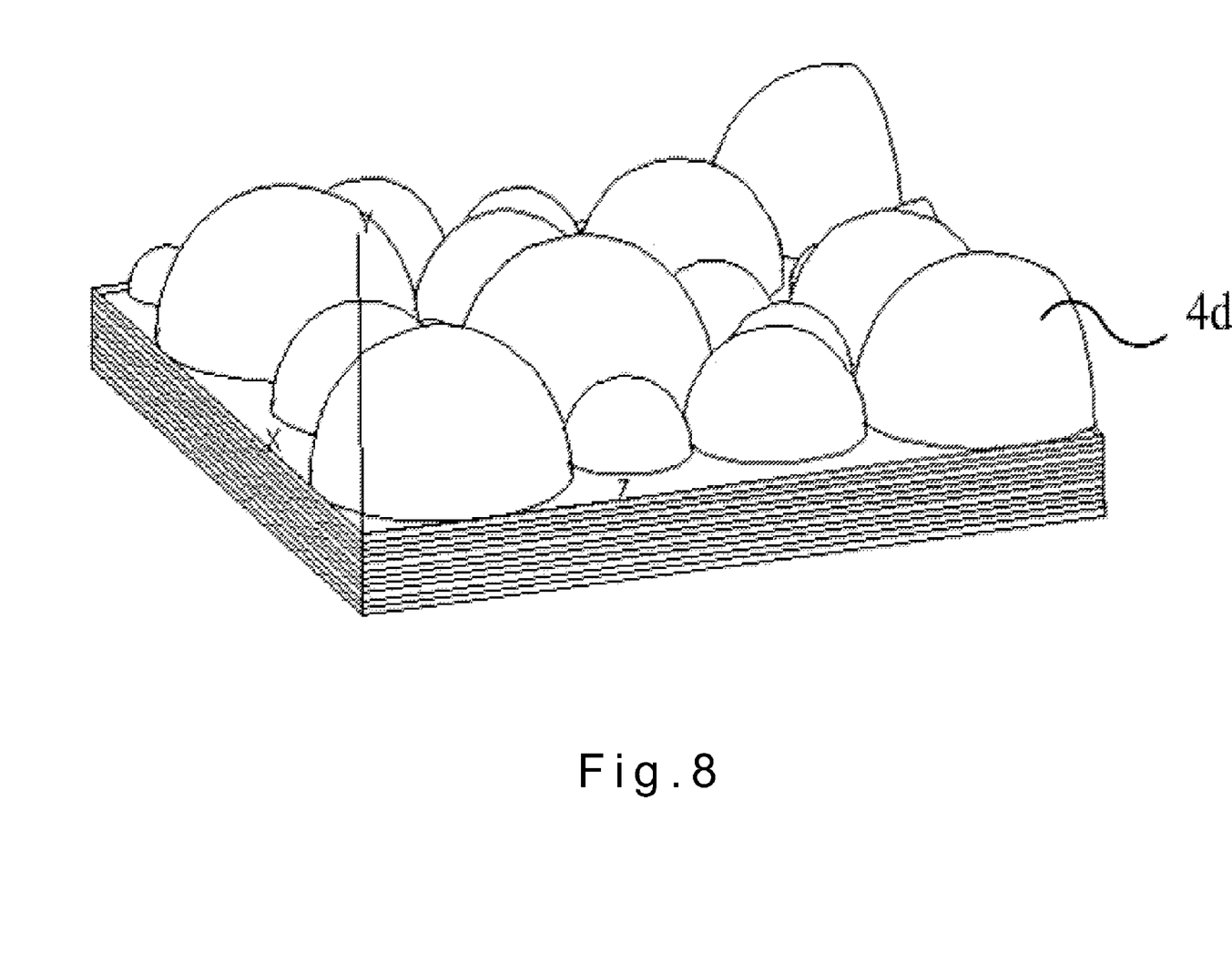
FIG. 8 is the perspective view showing the lens interface microstructure.
Figure 9:
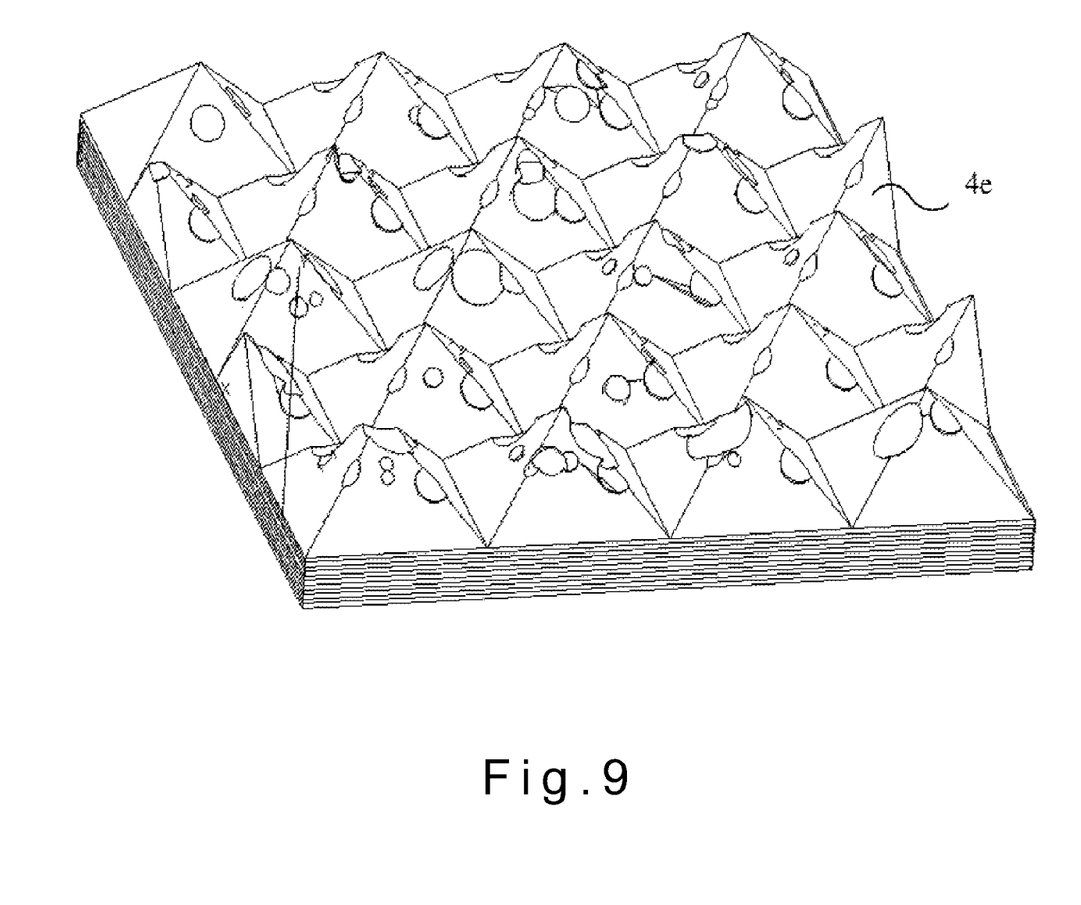
FIG. 9 is the perspective view showing the pyramid interface microstructure.

Please refer to FIG. 4, which is an enlarged view showing area A in FIG. 1. As shown in the figure, a transparent substrate 11 is made of glass or plastics, such as polyethylene terephthalate (PET), polycarbonate (PC) or polymethylmethacrylate (PMMA); and has a preferred thickness between 30 and 300 μm.

A multi-coated layer 12 above the transparent substrate 11 comprises an outer layer, which is a condensing optical layer 123 having a condensing microstructure 123a; and an inner layer, which is a diffusion layer combination 120 comprising a plurality of diffusion layers 121,122 each having an interface microstructure 121a,121b. Therein, the condensing optical layer 123 and the diffusion layers (a first diffusion layer 121 and a second diffusion layer 122) have a greater and greater refractive index to the upper layers, preferably. Or, the first diffusion layer 121 and the condensing optical layer 123 are made of materials having great refractive indexes; and the second diffusion layer 122 is made of a material having a small refractive index, which is made of UV curing or thermal setting resin. For making the interface microstructures 121a, 121b and the condensing microstructure 123, rollers or plates are used as molds; a resin layer is coated on the transparent substrate or each diffusion layer 121,122 by means of embossing; and UV curing or thermal setting is subsequently processed. Therein, each diffusion layer 121,122 having a random interface microstructure 121a,121b has a preferred thickness between 3 and 25 μm. Besides, each diffusion layer 121,122 in the diffusion layer combination 120 is added with proper particles for changing material or optical characteristics.

Because the outer layer of the condensing optical layer 123 requires a great light concentration, it is made of a material having a great refractive index between 1.4 and 1.7, where a number greater than 1.5 is preferable. In the other hand, the diffusion layer combination 120 is made of a material having a small refractive index between 1.3 and 1.6, where a number smaller than 1.5 is preferable. Therein, when the diffusion layer combination 120 comprises three layers, the first and the third layers are made of resin materials having small refractive indexes and the second layer, such as the outer layer of the condensing optical layer 123, is made of a resin material having a great refractive index.

Furthermore, an anti-static and wear-resistant protective coated layer 13 is applied below the transparent substrate 11 for enhancing its quality on an optical film application. Thus, a multi-coated hybrid optical film structure 1 is assembled.

On using the present invention, when an incident light 101~104 passes the diffusion layers 121,122, a refracted light 201~204 is generated and scattered owing to differences of refractive indexes in the diffusion layer combination 120. Thus, a haze effect is achieved with interface microstructures 121a,121b of various materials. Consequently, such a nebulization phenomenon is caused by means of interface-dominating mechanism.

In the present invention, a diffusion layer having a single random interface microstructure has a roughness greater than 0.5 μm. A difference between a refractive index of a condensing optical layer and that of the diffusion layer is greater than 0.05 so that the diffusion layer has a haze between 5 and 60% and a total transmittance smaller than 92%. Thus, a certain haze for light diffusion and a brightness gain between 97 and 100% to a normal condensing optical layer are obtained through optimized designs of materials and interface microstructures.

Finally, when the scattered light 201~204 enters the outer layer of the condensing optical layer 123, the light is concentrated with the specific designed condensing microstructure 123a. Thus, a hybrid optical film 1 having a high luminance and a high quality is fabricated with designs of a multi-coated optical film, interface microstructures and a condensing microstructure.

Please refer to FIG. 5 to FIG. 9, which are perspective views showing a random, a prism, a cone, a lens and a pyramid interface microstructures. As shown in the figures, interface microstructures are roughened through physical or chemical methods with rollers or plates as molds for obtaining random microstructures having miniature roughness. Then a diffusion layer is embossed for obtaining a diffusion layer having a random interface microstructure 4a, where the microstructure may has a surface being further processed to obtain random sunk spots. Besides, a prism interface microstructure 4b, a cone interface microstructure 4c, a lens interface microstructure 4d or a pyramid interface microstructure 4e can be fabricated.

To sum up, the present invention is a multi-coated hybrid optical film structure, where a design of a multi-coating technology is used for scattering and concentrating light; materials for scattering and concentrating effects are integrated in a single optical film to effectively reduce cost; by using diffusion layers having interface microstructures for scattering incident light, not only a luminance is effectively enhanced but also quality changes owing to particles added or warp of the film and scoring on the beneath optical film owing to particles coated are reduced; and, thus, with a simplified assembly of back-light module and an improved assembling efficiency, a quality and characteristics of the hybrid optical film is enhanced.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A multi-coated hybrid optical film structure, comprising
a transparent substrate, said transparent substrate having two opposite surfaces, said transparent substrate having a thickness between 30 and 300 micrometer (μm);
a multi-coated layer, said multi-coated layer being located on one of said two opposite surfaces of said transparent substrate, said multi-coated layer comprising
an inner layer of a diffusion layer combination, said diffusion layer combination scattering incident light, said diffusion layer combination having a refractive index between 1.3 and 1.6, said diffusion layer combination comprising at least one diffusion layer, said diffusion layer having a thickness between 1 and 50 μm, said diffusion layer having an interface microstructure, said interface microstructure having a roughness greater than 0.5 μm; and
an outer layer of a condensing optical layer, said condensing optical layer being located on said diffusion layer combination, said diffusion layer combination being located between said condensing optical layer and said transparent substrate, said condensing optical layer having a condensing microstructure to concentrate light, said condensing optical layer having a refractive index between 1.4 and 1.7; and
a protective coated layer, said protective coated layer being located on the other one of said two opposite surfaces of said transparent substrate, said protective coated layer being anti-static and wear-resistant.

2. The structure according to claim 1,
wherein said transparent substrate is made of a material having an optical transmittance and said material is selected from a group consisting of glass and plastics; and
wherein said material is further selected from a group consisting of polyethylene terephthalate (PET), polycarbonate (PC) and polymethyl-methacrylate (PMMA).

3. The structure according to claim 1,
wherein said diffusion layer has a preferred thickness between 3 and 25 μm.

4. The structure according to claim 1,
wherein said interface microstructure of said diffusion layer is selected from a group consisting of a prism interface microstructure, a cone interface microstructure, a lens interface microstructure and a pyramid interface microstructure.

5. The structure according to claim 4,
wherein said interface microstructure has a surface being further processed to obtain random sunk spots.

6. The structure according to claim 1, wherein said interface microstructure has a preferred roughness greater than 1 μm.

7. The structure according to claim 1, wherein said condensing microstructure is selected from a group consisting of a prism condensing microstructure, a cone condensing microstructure, a lens condensing microstructure and a pyramid condensing microstructure.

8. The structure according to claim 1, wherein said condensing optical layer has a preferred refractive index greater than 1.5.

9. The structure according to claim 1, wherein said diffusion layer has a preferred refractive index smaller than 1.5.

10. The structure according to claim 1, wherein said diffusion layer combination has three layers made of resin; and
wherein second layer of said three layers has a greater refractive index than that of first layer of said three layers and that of third layer of said three layers.

11. The structure according to claim 1, wherein a refractive index of said condensing optical layer has a difference greater than 0.05 to that of said diffusion layer; and
wherein said diffusion layer has a haze between 5 and 60 percents (%).

12. The structure according to claim 1, wherein said diffusion layer is further added with a particulate material; and
wherein said particulate material is selected from a group consisting of a non-organic material and an organic material.

* * * * *